United States Patent
Coushaine et al.

(10) Patent No.: US 7,588,359 B2
(45) Date of Patent: Sep. 15, 2009

(54) LED LAMP WITH DIRECT OPTICAL COUPLING IN AXIAL ARRANGEMENT

(75) Inventors: Charles M. Coushaine, Rindge, NH (US); Ralph Johnson, Bedford, NH (US); Thomas Tessnow, Weare, NH (US)

(73) Assignee: Osram Sylvania Inc., Danvers, MA (US)

( * ) Notice: Subject to any disclaimer, the term of this patent is extended or adjusted under 35 U.S.C. 154(b) by 161 days.

(21) Appl. No.: 11/477,731

(22) Filed: Jun. 29, 2006

(65) Prior Publication Data

US 2007/0070645 A1    Mar. 29, 2007

Related U.S. Application Data

(60) Provisional application No. 60/720,395, filed on Sep. 26, 2005.

(51) Int. Cl.
     *H01L 33/00*    (2006.01)
     *G02B 6/00*    (2006.01)
     *B60Q 1/26*    (2006.01)

(52) U.S. Cl. .............. 362/555; 362/540; 362/551; 362/800

(58) Field of Classification Search .............. 362/551, 362/554, 555, 556, 558, 559, 517, 518, 540–545, 362/548
See application file for complete search history.

(56) References Cited

U.S. PATENT DOCUMENTS

| | | | | |
|---|---|---|---|---|
| 4,630,177 A * | 12/1986 | Von Kohorn et al. | ........ | 362/551 |
| 5,039,832 A * | 8/1991 | Polacek et al. | ............. | 200/317 |
| 5,436,805 A * | 7/1995 | Hsu et al. | .................. | 362/559 |
| 5,707,130 A * | 1/1998 | Zwick et al. | ................ | 362/517 |
| 6,033,087 A * | 3/2000 | Shozo et al. | ................ | 362/244 |
| 6,304,693 B1 * | 10/2001 | Buelow et al. | ............... | 385/31 |
| 6,520,666 B1 | 2/2003 | Beyerlein | | |
| 6,527,411 B1 * | 3/2003 | Sayers | ....................... | 362/245 |
| 6,929,390 B2 * | 8/2005 | Amano | ...................... | 362/545 |
| 7,217,022 B2 * | 5/2007 | Ruffin | ....................... | 362/554 |
| 7,290,906 B2 * | 11/2007 | Suzuki et al. | .............. | 362/511 |
| 7,387,402 B1 * | 6/2008 | Lui (Phillip) | .............. | 362/196 |

(Continued)

FOREIGN PATENT DOCUMENTS

DE      103 12 950 A1      10/2004

(Continued)

*Primary Examiner*—Ismael Negron
*Assistant Examiner*—David R Crowe
(74) *Attorney, Agent, or Firm*—William H. McNeill (57) ABSTRACT

An LED light source (10) comprises a heat sink (12) having a body (14) with a front surface (16) and a rear surface (18), the rear surface (18) being provided with heat dissipaters (20). The front surface (16) includes a pocket (22) for the receipt of components (24), the components including at least one LEDs (25) and electrical circuitry therefor. A housing (26) has a flange (28) and a tubular projection (30) fitted into the pocket (22) in a manner to fix the components (24) in the heat sink (12); and an optical light guide (32) having at least one light pipes (34) is positioned in the tubular projection (30), each of the at least one light pipes (34) having a light input end (34*a*) fixed in light gathering alignment with the at least one LEDs (25) in a one-to-one relationship.

5 Claims, 9 Drawing Sheets

U.S. PATENT DOCUMENTS

| | | | |
|---|---|---|---|
| 2001/0002219 A1* | 5/2001 | Mori et al. .................... | 385/46 |
| 2004/0179349 A1* | 9/2004 | Buelow et al. ................ | 362/31 |
| 2005/0116176 A1 | 6/2005 | Aguirre | |
| 2005/0201100 A1* | 9/2005 | Cassarly et al. ............ | 362/317 |
| 2006/0077685 A1* | 4/2006 | Hsieh et al. ................ | 362/558 |
| 2006/0087861 A1 | 4/2006 | Tessnow | |
| 2006/0291249 A1* | 12/2006 | Tessnow .................... | 362/615 |

FOREIGN PATENT DOCUMENTS

| | | |
|---|---|---|
| EP | 1 031464 A2 | 8/2000 |
| EP | 1 298 | 4/2003 |
| EP | 1 544 037 A | 6/2005 |
| EP | 1 640 753 A | 3/2006 |
| GB | 1 310 790 A | 3/1973 |
| GB | 2 365 962 | 2/2002 |
| JP | 2005 227050 | 8/2005 |

* cited by examiner

LED LAMP WITH DIRECT OPTICAL COUPLING IN AXIAL ARRANGEMENT

CROSS-REFERENCE TO RELATED APPLICATION

This application claims priority from Provisional Patent Application No. 60/720,395, filed Sep. 26, 2005.

TECHNICAL FIELD

This invention relates generally to light sources and more particularly to light sources employing light emitting diodes (LED or LEDs). Still more particularly, it relates to LED light sources for use with direct optics. Further, it relates to LED light sources having a specific application to indicator lights for vehicles.

BACKGROUND ART

Competitive pressures in industry, particularly the automotive industry, dictate a necessity to make light sources as small and economical as possible. This saves material costs, and can improve optical imaging. In competition with these needs, large fields areas may need to be illuminated, and with vehicle illumination, a substantial visual image is need on the surface of the vehicle to mark the presence of the vehicle. These goals have been met in the past by the use of relatively large incandescent lamp and reflector systems. The advent of solid-state lighting, such as light emitting diodes, has pointed in the direction of improving these systems by drastically reducing the size of the light source while increasing their longevity; however, there is still a need to spread beam-forming illumination over a broad area to better illuminate the vehicle. It would be an advance in the art if such a system could be provided without the necessity of using a reflector. It would be a further advance in the art to provide a lighting system that can utilize replacement light sources. It would be a still further advance in the art to provide a combination solid-state light source with a direct view optic that can be customer designed in a variety of displays.

DISCLOSURE OF THE INVENTION

It is, therefore, an object of the invention to obviate the disadvantages of the prior art.

It is yet another object of the invention to enhance light sources.

Still another object of the invention is the enhancement of automotive indicators.

These objects are accomplished, in one aspect of the invention, by an LED light source comprising: a body with a front surface and a rear surface, the front surface including a pocket for the receipt of components, the components including at least one LEDs and electrical circuitry therefor; a housing fitted into the pocket in a manner to fix the components in the heat sink; and an optical light guide having at least one light pipes positioned in the tubular projection, each of the at least one light pipes having a light input end fixed in light gathering alignment with the at least one LEDs in a one-to-one relationship.

The objects are accomplished in another aspect of the invention by an indicator comprising: a reception area having a first surface and a second, opposite surface formed in a body and having a substantially centrally located light source receiving aperture formed therein; an optic operatively mounted in the reception area with respect to the first surface, the optic having at least one optic input windows; and an LED light source replaceably mounted with respect to the second surface, the LED light source including an optical light guide having at least one light pipes with at least one output ends operatively connected to the at least one optic input windows.

The light source of this invention is small and economical. It is structured to physically fit in locations designed for the standard S8 lamp socket and, when combined with the custom optic, eliminates the need for reflectorized coatings.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
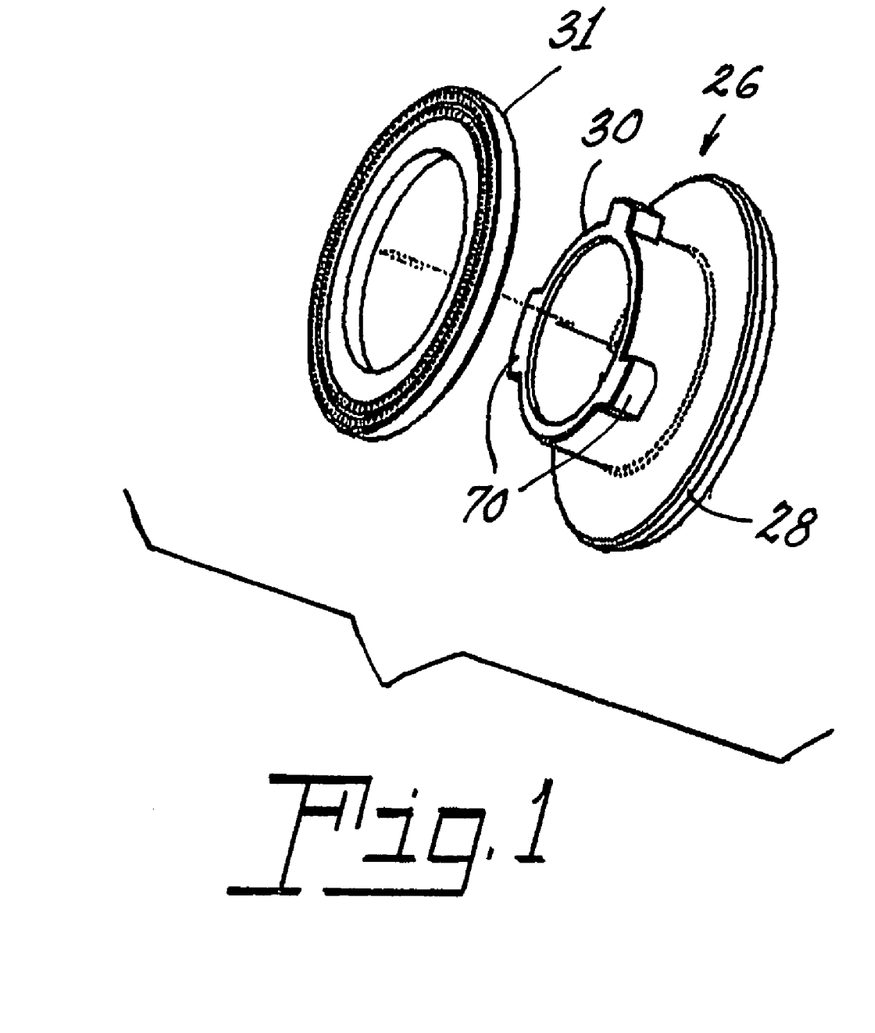
FIG. 1 is an exploded, perspective view of a housing that can be used with an embodiment of the invention.
Figure 2:
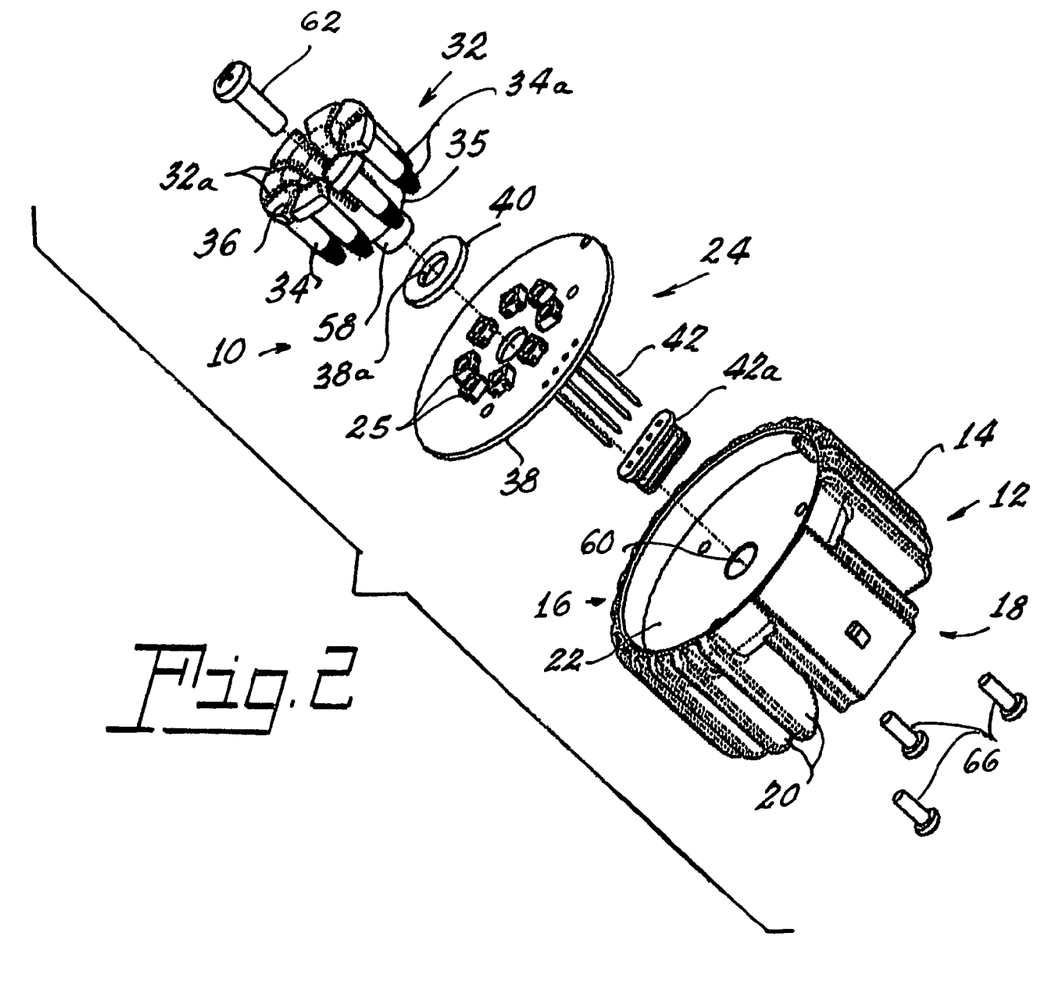
FIG. 2 is an exploded, perspective view of a first embodiment of the invention.
Figure 3:
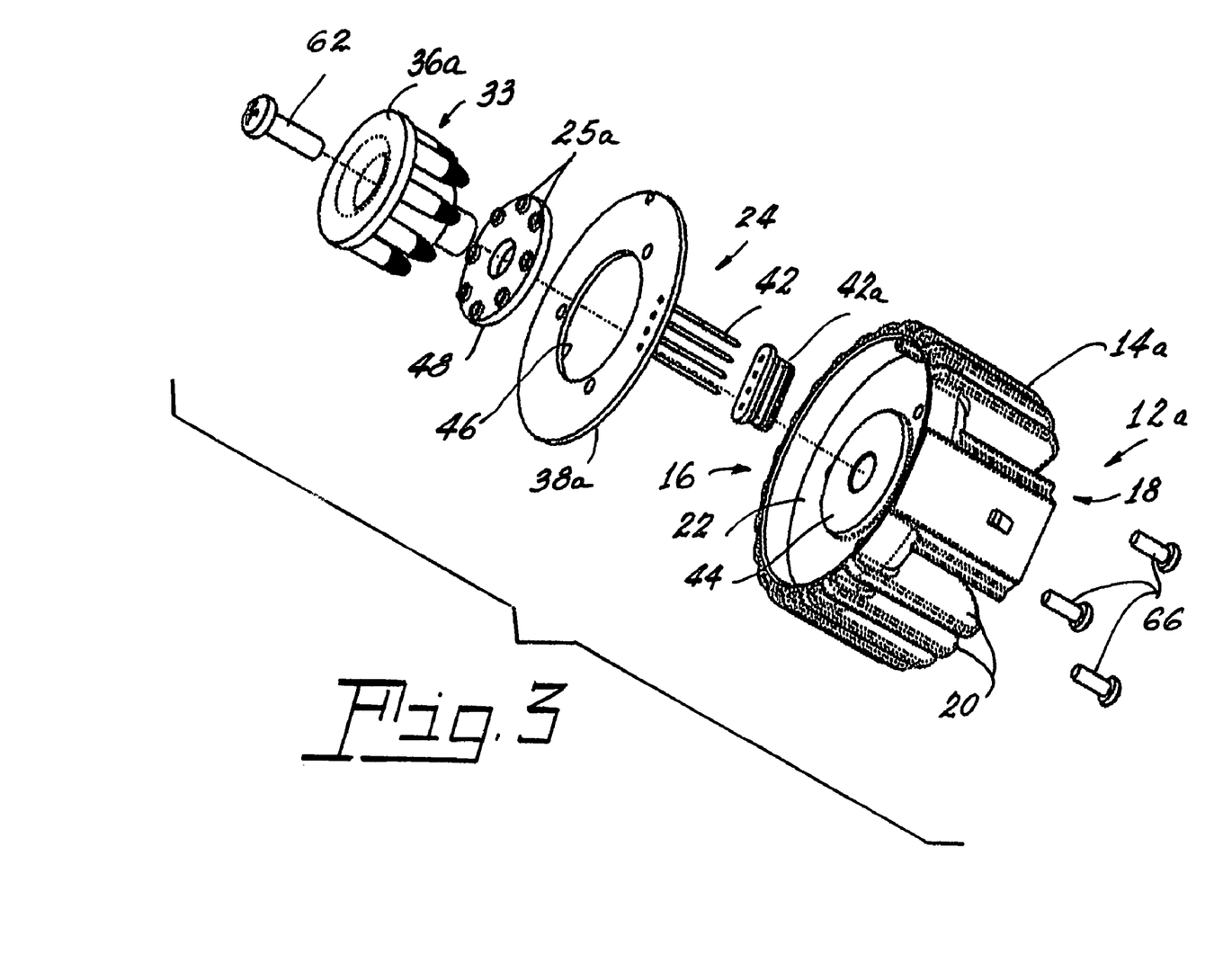
FIG. 3 is an exploded, perspective view of an alternate embodiment of the invention.
Figure 4:
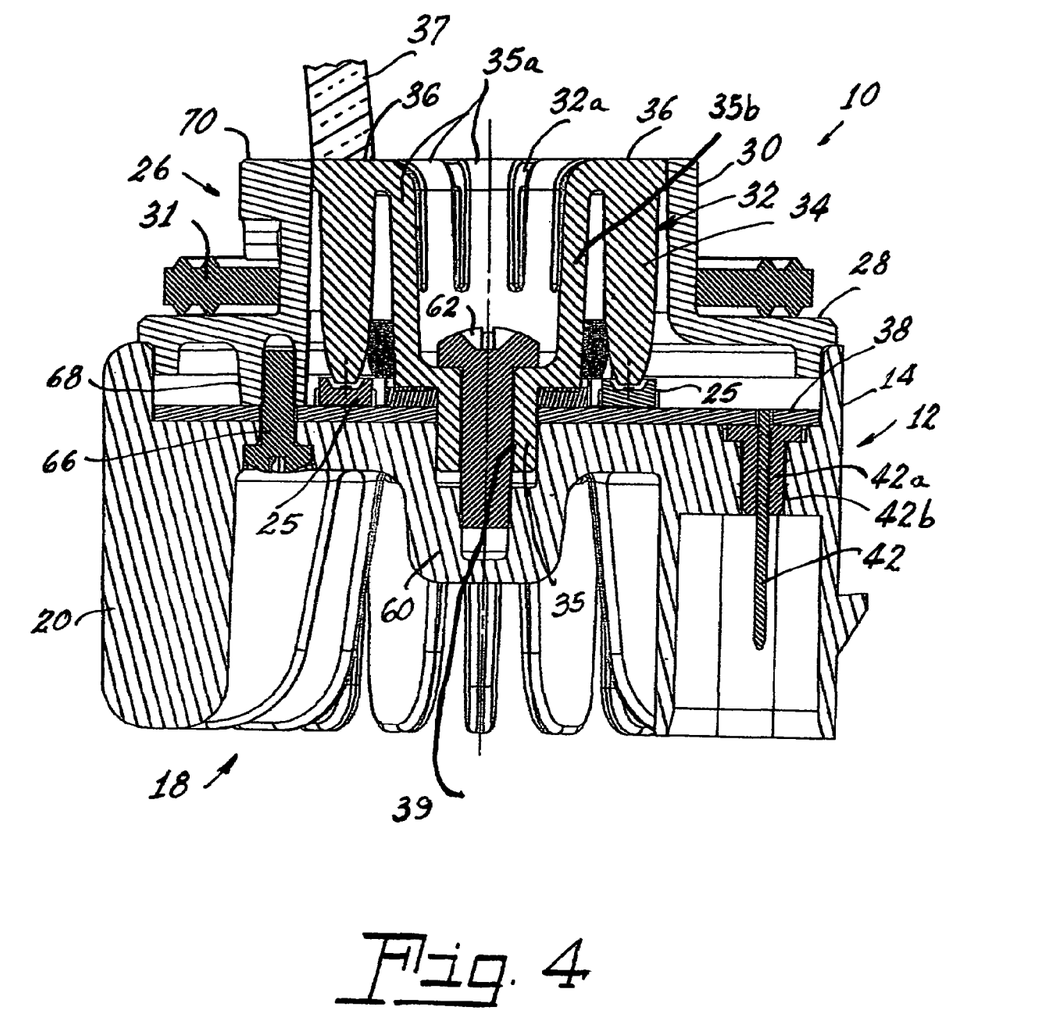
FIG. 4 is an enlarged, sectional view of the embodiment of FIG. 2.

Referring now to the drawings with greater particularity, there is shown in FIGS. 1-3 first and second embodiments 10 (FIG. 2) and 10a (FIG. 3) of an LED light source comprising: a heat sink 12 having a body 14 with a front surface 16 and a rear surface 18, the rear surface 18 being provided with heat dissipaters 20 in the form of radial fins. The front surface 16 includes a pocket 22 for the receipt of components 24 including at least one LED 25, 25a and electrical circuitry therefor (not shown). Common to both embodiments is a housing 26 having a flange 28 and a tubular projection 30 as shown in FIG. 1. A sealing gasket 31 can also be provided for supplying an environmental seal when the LED light source 10 is mounted. The flange 28 is fitted into the pocket 22 to fix the components 24 in the heat sink 12 in a manner to be described hereinafter. In the embodiment shown in FIGS. 2 and 4 the LEDs 25 are preferably of the type known as Advanced Power TOPLED®s (APT). In the embodiment shown in FIGS. 3 and 5 the LEDs 25a are preferably of the type known as chip-on-board, such as OSTAR®. Both the APT and OSTAR® LEDs are available from OSRAM OPTO Semiconductors GmbH, Regensburg, Germany Referring now to the specific embodiment of FIG. 2, an optical light guide 32 of a suitable transparent material such as acrylic or polycarbonate has at least one light pipe 34 surrounding a core 35. In all of the preferred embodiments disclosed herein the number of light pipes and LEDs is eight; however, other numbers of LEDs can commonly be supported on a central core 35 formed with a bore 39 for a threaded or similar attachment. The optical light guide 32 is positioned in the tubular projection 30 so that each of the at least one light pipes 34, each having a light input end 34a, is fixed in light gathering alignment with a corresponding one of the at least one LEDs 25 in a one-to-one relationship. The relationship is shown most clearly in FIG. 8. Slots 32a are formed between the light pipes 34 and supports 35a to allow flexing of the light pipes 34 relative to each other and to the central core 35 to accommodate tolerances in packaging of the LEDs 25. A protuberance 58 therein extends from the bottom of the optical light guide 32 and has bore 37a therein.

Each of the at least one light pipes 34 has a light output end 36 opposite the light input ends 34a formed to direct light to a suitable location, such as to an optic 37. An optic 37 is partially shown in FIGS. 4 and 5 and more completely shown in FIGS. 6 and 7.

The components 24 additionally include a printed circuit board 38 (PCB) that carries the electrical circuitry (not shown) and an adjustment washer 40 centrally positioned with the printed circuit board 38. The printed circuit board 38 has a central aperture 38a and a plurality of connectors 42 positioned thereon to extend beyond the printed circuit board for connection to a power source. The connectors 42 project through an electrically insulating washer 42a that is fitted into a compartment 42b in the heat sink 12.

For assembly of the LED light source 10, the electrically insulating washer 42a is fitted into compartment 42b in the heat sink 12 and the printed circuit board 38 is placed in pocket 22 with the connectors 42 penetrating the insulating washer 42a and extending therefrom for subsequent attachment to a power source. Washer 40 is positioned on the PCB and the light guide 32 is fitted thereon with the protuberance 58 extending through the adjustment washer 40, the aperture 38a and into a well 60 formed in the center of pocket 22. A bolt 62 is inserted through an aperture in the protuberance 58 and into engagement with a treaded portion in the well 60. Controlling the amount of penetration of the bolt 62 into the well 60, in combination with the flexing slots 32a formed between the pipes 34, assures that the input windows 34a are closely abutted to a respective LED die without damage to the LED or light guide, thus insuring maximum light input into the light guide 32.

The housing 26 is then applied with the flange 28 fitted into the pocket 22 and the tubular projection 30 surrounding the light guide 32. Fasteners 66, which can be in the form of threaded bolts, are inserted from the base of the heat sink 12 and engage threaded portions 68 formed on the underside of the flange 28, as seen most clearly in FIGS. 4 and 5.

Figure 5:
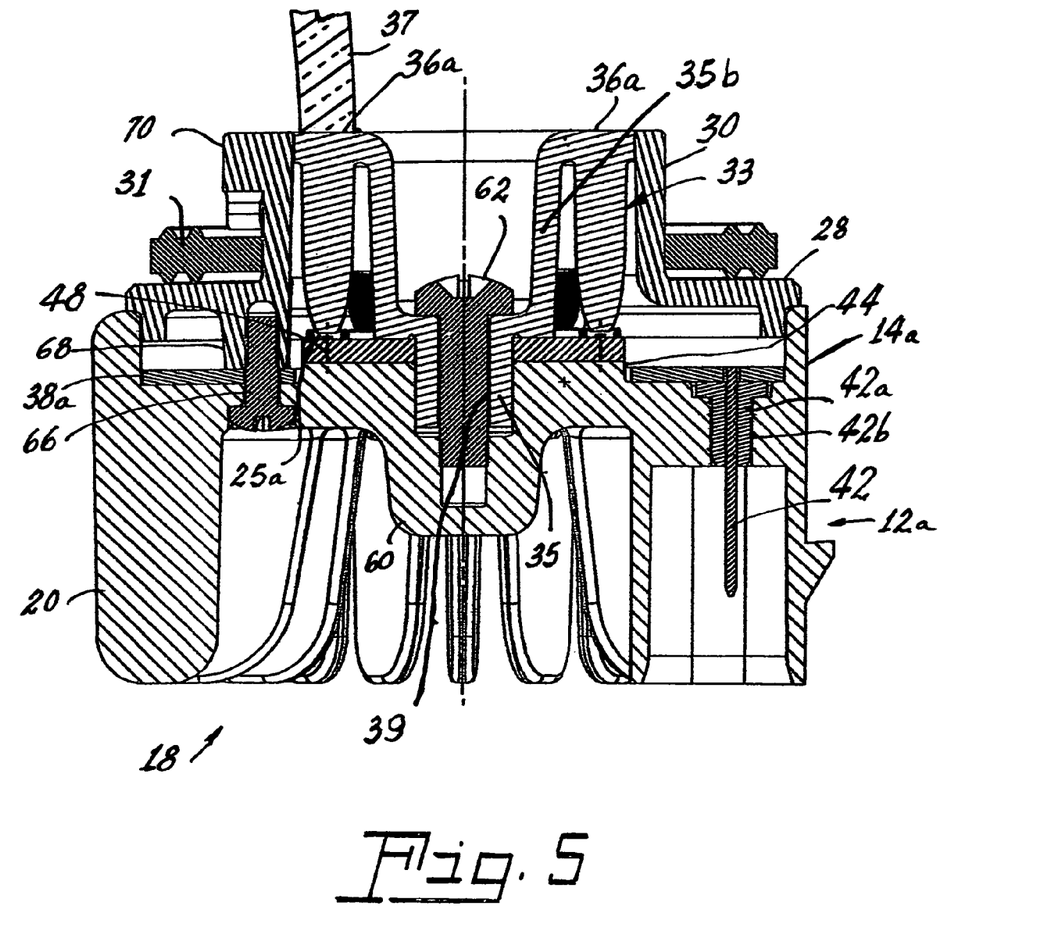
FIG. 5 is an enlarged, sectional view of the embodiment of FIG. 3.

Referring now to FIGS. 3 and 5, a heat sink 12a includes a central boss 44 in the pocket 22 and a PCB 38a includes a central aperture 46 that surrounds the boss 44. A metal-clad printed circuit board 48 mounts at least one LEDs 25 and is positioned on the boss 44. In this embodiment the LEDs 25a are preferably of the type known as chip-on-board, such as the aforementioned OSTAR® and, therefore, a light guide 33 does not require the flexing slots and can be solid because it is not necessary to accommodate varying tolerances that may occur in die packages since those packages are not present. Also, the adjustment washer is eliminated.

The LED light source 10 is ideally suited for use with an indicator 50 (FIG. 7) that comprises a reception area 52 having a first surface 52a and a second, opposite surface 52b formed in a body 54 and having a substantially centrally located light source receiving aperture 56 formed therein. The body 54 can be a portion of a vehicle, such as rear quarter panel, and the indicator 50 can be a taillight or stoplight.

Figures 6, 7:
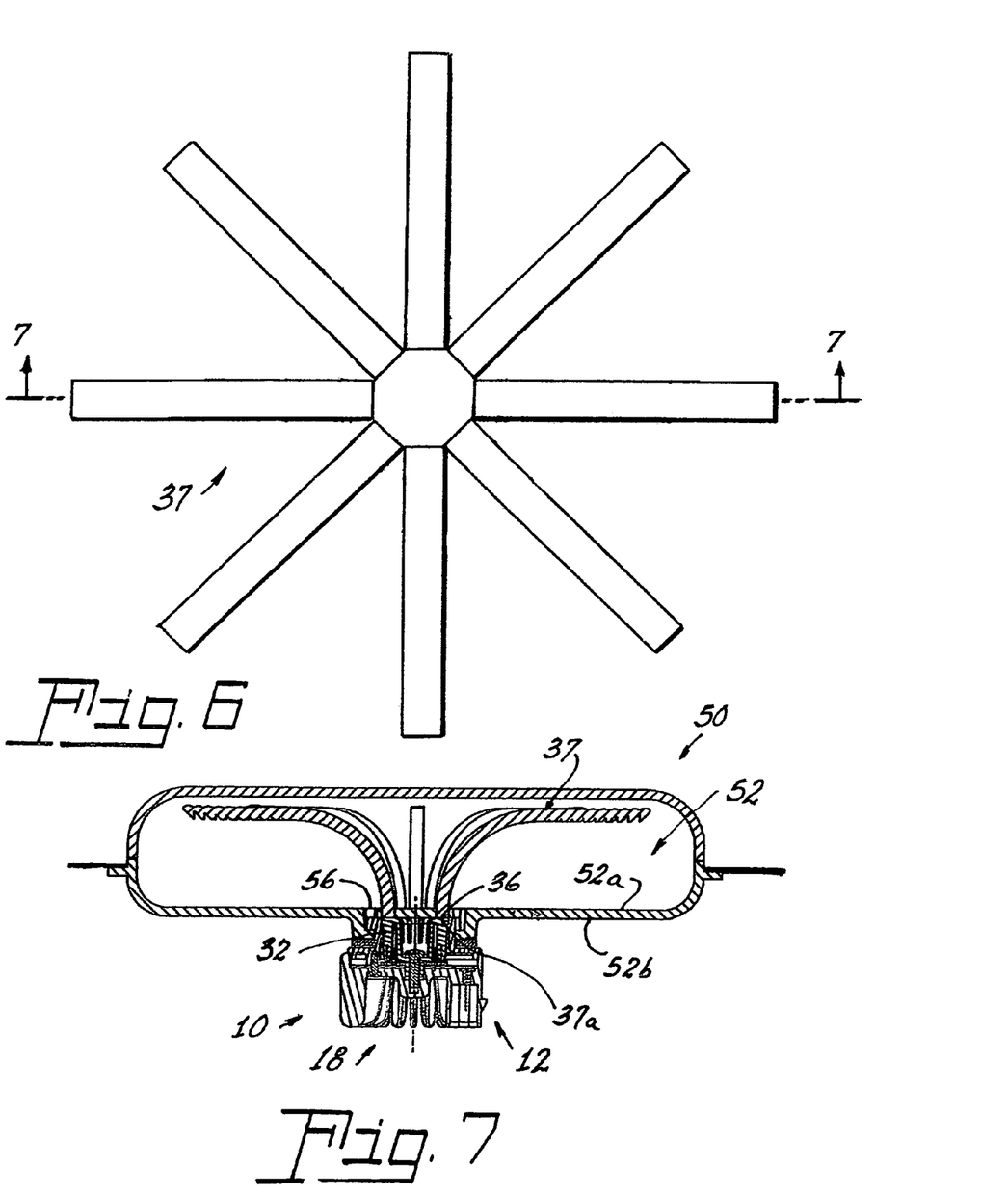
FIG. 6 is a plan view of an optic that can be used with an embodiment of invention.
FIG. 7 is a sectional view of an installed embodiment of the invention.

An input end of optic 37 is operatively mounted in the reception area 52 with respect to the first surface 52a. The optic 37 has a number N of optic input windows 37a to mate with the corresponding output windows of the LED light source 10.

The LED light source 10 is replaceably mounted with respect to the second surface 52b, for example, by rotating the unit to engage the lugs 70 formed on the tubular projection 30, with suitable engaging slots formed with the second, opposite surface 52b. This arrangement is fairly standard in the automotive industry.

In the embodiment shown in FIGS. 6 and 7 the optic 37 has a plurality of outputs 37b extending away from a centerpoint; however, virtually any configuration can be provided so long as the input windows of the optic match the output windows of the light guide. Additionally, if desired, either or both sides of the ends of the legs can be provided with suitable lensing to increase or otherwise modify the light output.

An added advantage of this system is the elimination of a reflectorized surface, allowing the reception area 52 to have the same color as the body 54 and vastly increasing design options.

Figure 8:
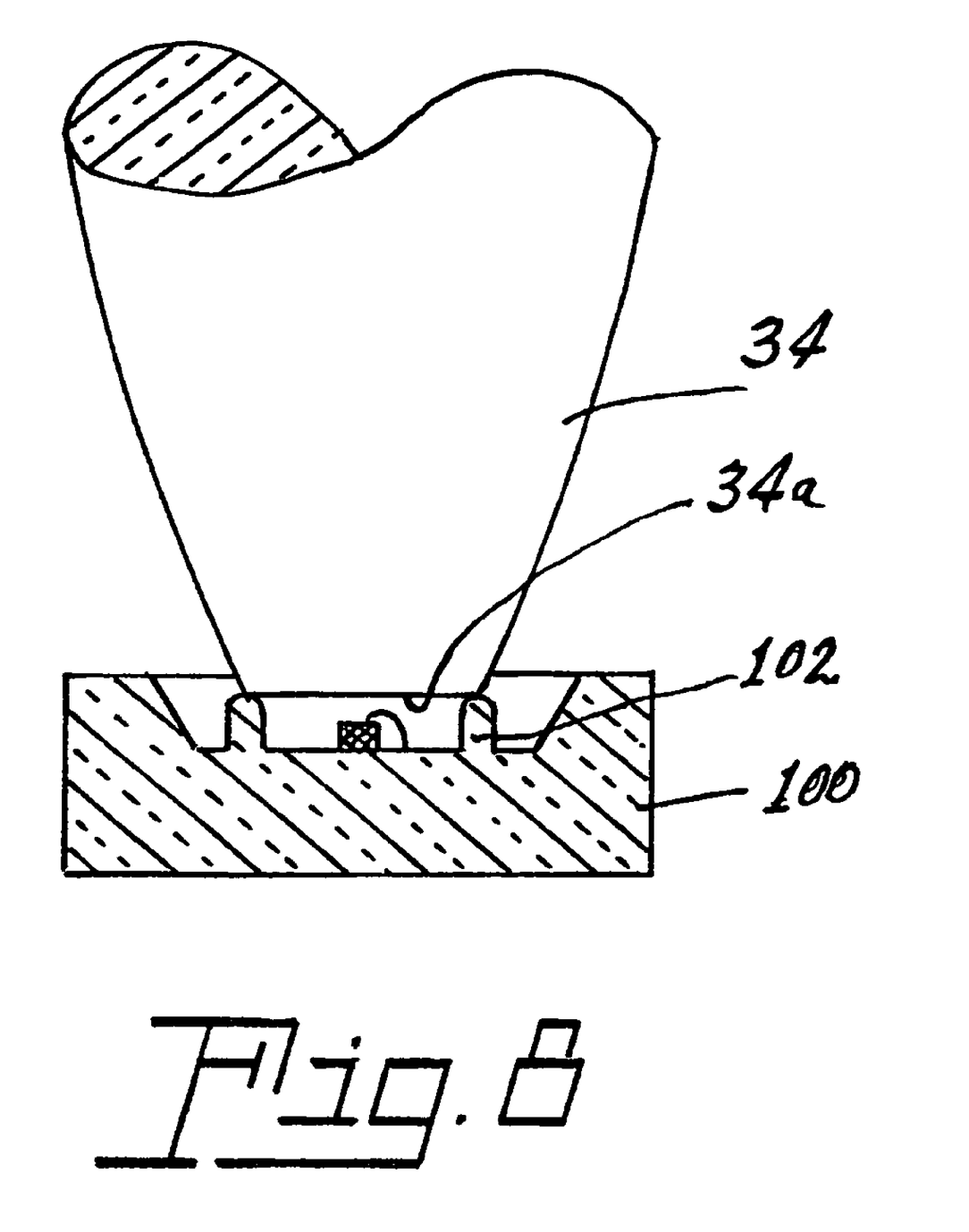
FIG. 8 is an enlarged view of a light guide-LED interface.

Critical to the use of any system involving LEDs (or other light sources) and optics is the alignment of the light source and optic to maximize the useful light output. One way in which this can be accomplished is via the adjustment screw and adjustment washer described above. Another approach is shown in FIG. 8 wherein an LED die 100 is provided with internal projections 102 surrounding the LED. Such internal projections can have a height that is very accurately controlled and thus allow accurate positioning of the abutted light input window 34a of a light pipe 34 in relation to the LED by allowing contact to be made between the input window 34a and the projections 102.

Figure 9:
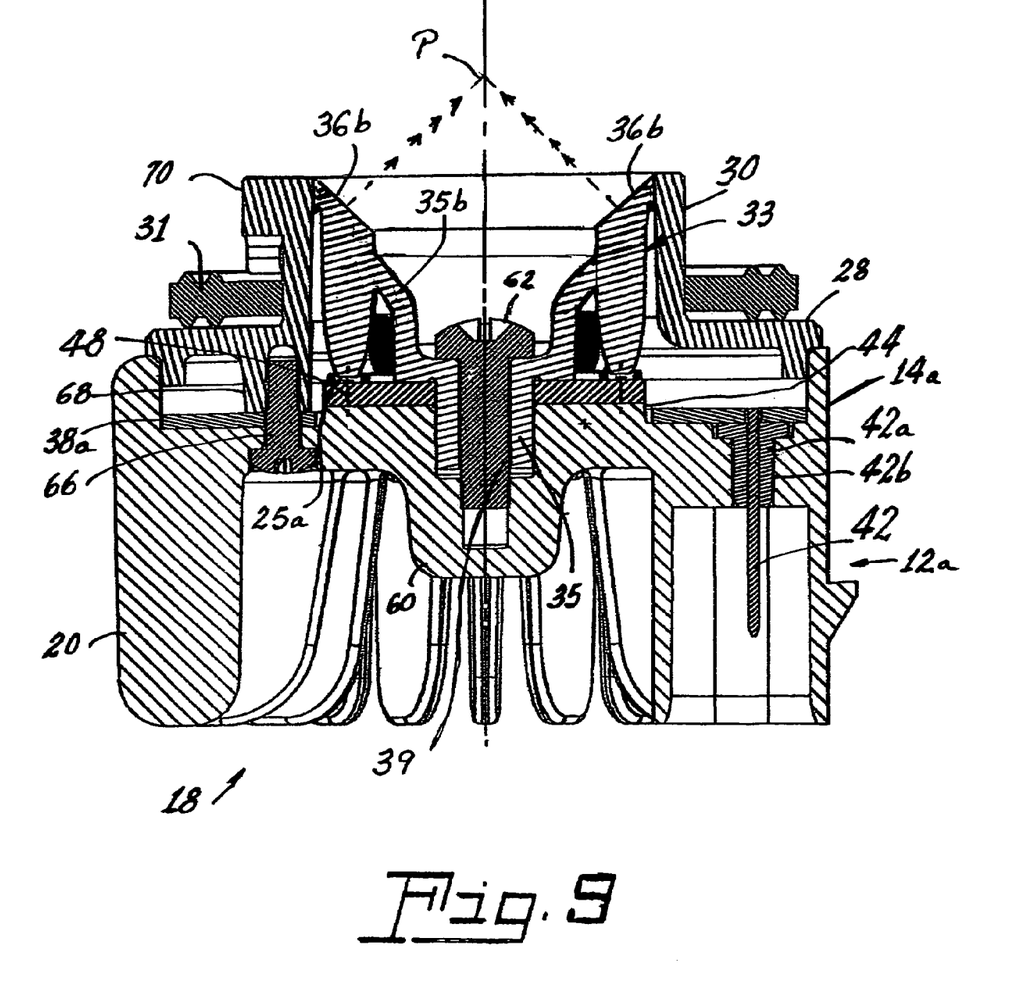
FIG. 9 is a sectional view of an alternate embodiment of light guide.

Referring now to FIG. 9, there is shown an alternate light guide 33a wherein output windows 36b are formed at an angle relative to the input windows 34a, such that light emanating therefrom is focused at a point P above the light guide. The light focused at point P can be directed into an optic or lens or any other suitable device.

Figure 10:
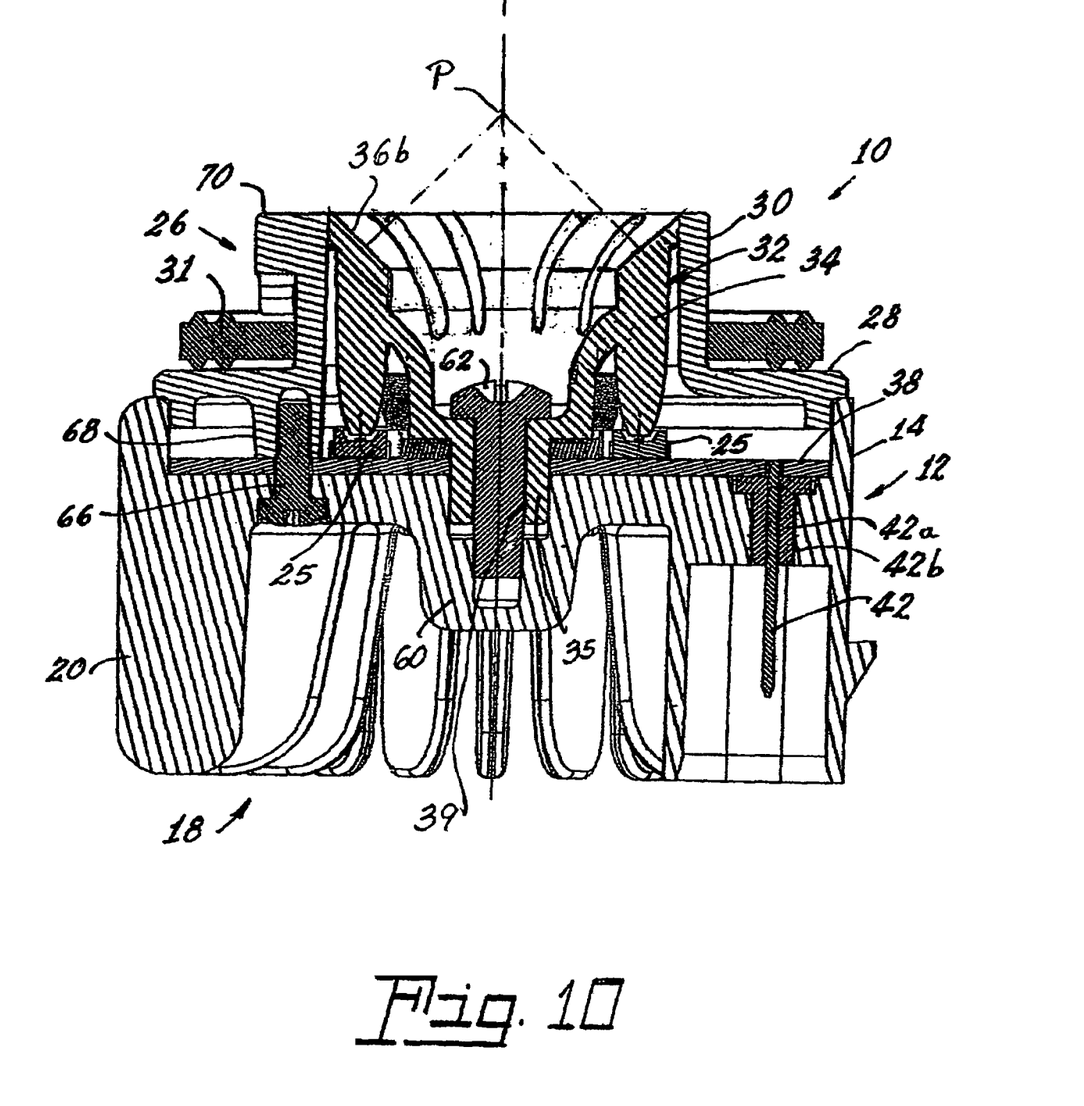
FIG. 10 is a sectional view of an additional embodiment of a light guide.

Referring now to FIG. 10, a light guide 32a similarly can be provided with angled output windows 36b to focus the emanated light upon a point P.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. An LED light source comprising:

a body with a front surface and a rear surface, said front surface including a pocket for the receipt of components, said components including first and second printed circuit boards, said first printed circuit board being metal clad and including at least one LED and electrical circuitry therefore, said pocket having a central boss, said second printed circuit board including a central aperture that surrounds said boss, said first printed circuit board being mounted directly upon said central boss;

a housing fitted into said pocket in a manner to fix said components in said body, said housing including a flange and a tubular projection; and an optical light guide having at least one light pipe positioned in said tubular projection, each of said at least one light pipes having a light input end fixed in light gathering alignment with said at least one LED in a one-to-one relationship.

2. An optical light guide for an automotive vehicle, said light guide being sized for reception into an aperture formed to receive an S8 bulb, said light guide comprising:

a central core having a longitudinal axis and a central bore coaxial with said longitudinal axis;

a plurality of light pipes;

a plurality of light pipe supports extending from said central core, each of said plurality of light pipe supports supporting a respective light pipe, each light pipe being formed from a light transmissive material and having a light input window, a light output window, and an internally reflective wall extending from the input window to the output window, each of said light pipes being separated from adjacent light pipes by a flexing slot;

a housing for supporting said central core, said housing including a plurality of LEDs equal in number to said light pipes, said LEDs being spaced about a central opening, each of said light pipe input windows being operatively mounted with respect to one of said LEDs; and an adjustment member positioned in said central bore and in engagement with said central opening whereby adjusting said adjustment member affects the alignment of said light pipes with said LEDs.

3. The optical light guide of claim 2 wherein said central opening is threaded and said adjustment member has matching threads.

4. The optical light guide of claim 3 wherein adjusting said adjusting member involves tightening or loosening said adjustment member.

5. The optical light guide of claim 4 wherein said light transmissive material is selected from the group of acrylics and polycarbonates.

* * * * *